United States Patent [19]

Councell

[11] 3,998,741

[45] Dec. 21, 1976

[54] MAGNETICALLY ATTRACTABLE PARTICLE SEPARATOR

[76] Inventor: Graham D. Councell, 8242 Brookgreen Road, Downey, Calif. 90240

[22] Filed: Feb. 26, 1976

[21] Appl. No.: 661,782

[52] U.S. Cl. .............................. 210/222; 209/222; 209/229

[51] Int. Cl.[2] ........................................ B01D 35/06

[58] Field of Search .................. 210/222, 223, 354; 209/221, 222, 228, 229, 230

[56] References Cited

UNITED STATES PATENTS

| | | | |
|---|---|---|---|
| 405,045 | 6/1889 | Mowrar | 209/229 |
| 2,094,615 | 10/1937 | Parker | 209/222 |
| 2,471,044 | 5/1949 | Scrivener | 210/222 |
| 3,343,679 | 9/1967 | Lavender | 210/354 |
| 3,372,807 | 3/1968 | Barnard | 210/223 X |
| 3,712,472 | 1/1973 | Elliott | 210/222 |
| 3,834,539 | 9/1974 | Thompson | 210/223 |
| 3,941,700 | 3/1976 | Sundt | 210/223 |

*Primary Examiner*—Theodore A. Granger
*Attorney, Agent, or Firm*—William C. Babcock

[57] ABSTRACT

A device for use in separating magnetically attractable particles from a stream of liquid in which they are entrained, and segregating the separated particles in a confined space. The separated particles may be periodically discharged from the confined space into a suitable container without interrupting the flow of stream of liquid. A window in the device permits the user to visually observe the separated particles moving by gravity from the stream of liquid to the confined space.

3 Claims, 5 Drawing Figures

DISK REFINER
REG.
V

MAGNETICALLY ATTRACTABLE PARTICLE SEPARATOR

BACKGROUND OF THE INVENTION

1. Field of the Invention

Magnetically attractable particle separator.

2. Description of the Prior Art

In the corrugated paperboard industry, it is common practice to use reclaimed paperboard that is subjected to a power driven refiner to disintegrate the paperboard. The disintegrated paperboard in the form of a liquid slurry is fed to a regulator, then deposited as a thin film on a moving screen to be formed into the sheet material, and the sheet material then fed through meshed sets of corrugating rolls that are in pressure contact. If the particles of magnetically attractable material that are steel and quite hard, are allowed to become embedded in the sheet material, they may cause substantial damage to the corrugating rolls as the sheet material passes therebetween.

A major object of the present invention is to provide a device that may be inserted in a line through which a liquid flows that contains particles of magnetically attractable material to automatically remove the particles therefrom, direct the removed particles to a segregated confined space, and periodically discharge the removed particles from the confined space without interrupting the flow of liquid through the line.

SUMMARY OF THE INVENTION

The invention is a device for removing particles of a magnetically attractable material from liquid flowing through a line. The invention includes a tubular rigid tee that has first and second axially aligned legs, and a third leg normally disposed to the first and second legs. The tee is connected to the line in such a manner that liquid flows first through the first leg and then through the second leg, and the third leg being substantially vertically disposed. A vertically positioned tubular member is provided that has first and second ends, with the tubular member including a transparent window. A first slide valve is connected to the free end of the first leg and the first end of the first tubular member, with the slide valve normally in an open position to permit the tubular member to fill with liquid that flows therein from the line. A second slide valve is connected to the second end of the tubular member, with the second slide valve normally in a closed position to maintain liquid in the tubular member. A transverse shaft is rotatably and sealingly supported in the tee intermediate the first and second legs and above the first leg. The shaft includes a first end portion that projects outwardly from the tee. Power means are provided for rotating the shaft in such a direction that the portion of the shaft most adjacent the third leg rotates toward the first leg. A number of laterally spaced circular, permanent magnets are rigidly secured to the shaft and situated within the interior of the tee, with each of the magnets including a circumferential edge and a pair of side walls.

An elongate non-metallic resilient spring is provided that has first and second end portions, with the second end portion in the form of a number of laterally spaced, parallel, rectangular strips, each of said strips is defined by a first free end edge and a pair of side edges, and the second end portion including a number of second end edges that extend between the strips.

The spring is held within the interior of the tee from the first leg by conventional means, in such a position that the first end edges slidably engage the shaft, the side edges slidably engage the side walls, and the second end edges slidably engaging the circumferential edges of the magnets. A liquid, as it flows through the tee, has the particles of magnetically attractable material therein separated therefrom by the particles adhering to the magnets as they rotate, with the adhered particles subsequently being displaced from the magnets by contact with the spring. After the particles are displaced from the magnets, they drop downwardly by gravity in the liquid in the tubular member to accumulate in the tubular member above the second slide valve. The particles of magnetically attractable material that accumulate in the tubular member are periodically discharged therefrom by placing the first slide valve in a closed position and opening the second slide valve to permit the particles of magnetically attractable material that have accumulated in the tubular member thereabove to discharge from the tubular member thereabove to discharge from the tubular member by gravity together with the quantity of liquid that was in the tubular member. After the particles of magnetically attractable material have been discharged from the tubular member, the second and first slide valves are in sequence placed in closed and open positions respectively to permit the tubular member to fill with liquid and have particles of magnetically attractable material discharged thereinto in the same manner as previously described. The particles of magnetically attractable materials, as they move downwardly in the tubular member, are visible through the window.

DESCRIPTION OF THE PREFERRED EMBODIMENT

Figures 1, 2, 3, 4:
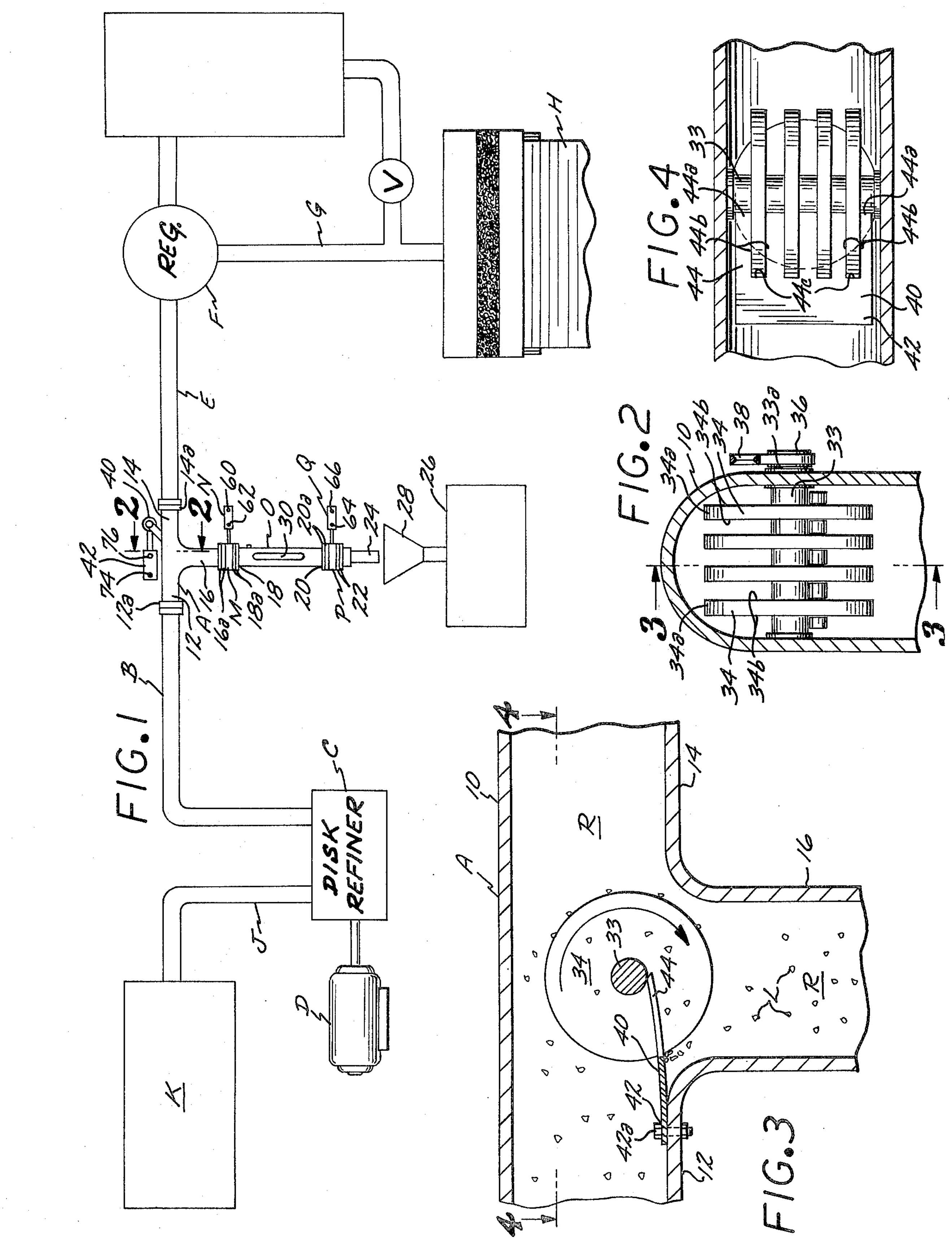
FIG. 1 is a side-elevational view of the invention installed in a line through which liquid flows from a disk refiner to a regulator used in the forming of corrugated sheet material.
FIG. 2 is a fragmentary transverse cross sectional view of the invention taken on the line 2—2 of FIG. 1.
FIG. 3 is a longitudinal cross-sectional view of the invention taken on the lines 3—3 of FIG. 2.
FIG. 4 is a longitudinal cross-sectional view of the invention taken on the lines 4—4 of FIG. 3.

The invention A that is used in separating particles of magnetically attractable material from a liquid is illustrated as being used in conjunction with equipment to form corrugated paperboard. The invention is shown in FIG. 1 as connected to a first tubular line B that extends to a disk refiner C driven by a motor D. A second tubular line E extends from the invention A to a regulator F of conventional design, which has a conduit G extending therefrom to a moving screen H on which particles are deposited as a film to form a sheet material when dried, with the sheet material then moving to corrugated rolls (not shown). A source K of reclaimed paperboard is connected by a third tubular line J to the disk refiner C. The disk refiner C supplies a slurry of disintegrated paperboard that may contain hard particles L of a magnetically attractable material to the invention A. The invention A comprises a tubular tee 10 that has first, second and third tubular legs 12, 14 and 16. The first and second legs 12 and 14 are axially aligned and are connected to the first and second lines B and E by pairs of first and second flanges 12*a* and 14*a*. The third tubular leg 16, as may be seen in FIG. 1, is vertically disposed.

The free end of the third tubular leg 16, by a pair of flanges 16*a*, is connected to a first splined valve M that is spring-loaded and normally closed, and is moved to the open position when a first solenoid N is electrically energized. A tubular member O is provided that is vertically disposed as shown in FIG. 1 and has first and second ends 18 and 20. The first end 18 by a pair of flanges 18*a* is connected to the first slide valve M. The second end 20, by a pair of flanges 20*a*, is connected to a second spring-loaded valve P that normally is in a closed position. The second slide valve P may be placed in the open position by electrically energizing a second solenoid Q that forms a part thereof. The second slide valve P has the lower end thereof connected by a pair of flanges 22 to a spout 24. A container 26 having a funnel 28 mounted thereon receives particles of magnetically attractable material L that has been separated from liquid flowing in the lines B and E by use of the invention A as will later be described in detail. A tubular member O has a longitudinally extending transparent window 30 formed therein.

The tee 10, as shown in FIG. 2, has a transverse shaft 32 rotatably and sealingly supported therein at a position intermediate the first and second legs 12 and 14 and above the third leg 16. The shaft 32 includes an outwardly extending first portion 32*a*. A number of circular magnets are supported in fixed laterally spaced positions on the shaft 32, with each of the magnets 34 including a circumferential edge 34*a* and a pair of side walls 34*b*. Shaft portion 34*a* has a drill and pulley 36 mounted thereon that is engaged by an endless belt 38 that extends to a driven pulley 39 that is rotated by an electric motor 42. The shaft 33 is rotated in such a direction that the lower portion thereof most adjacent the first leg 12, rotates towards the first legs, as does the lower portion of the magnets 34. A resilient spring 40 is provided, that is formed from a known magnetic material, and has a first end portion 42 that is secured to the lower portion of the first leg 12 as may be seen in FIG. 3 by conventional means 42*a* such as bolts or the like. The spring 40 has a second end portion that is in the form of a number of laterally spaced strips 44 of rectangular shape, which strips have first end edges 44*a*, pairs of side edges 44*b*, and the second portion including a number of second end edges 44*c* that extend between the strips. The spring 40, as may best be seen in FIG. 3 extends from the first leg 12 towards the second leg 14, and is in the directional flow of liquid Q through the invention A.

The first end edges 44*a* of the spring 40, as may best be seen in FIG. 4, are in slidable rubbing contact with the shaft 33. The strips 44 have the pairs of side edges 44*b* in rubbing contact with the side walls 34*b* of the magnet 34. The second edges 44*c* of the spring 44 are in slidable rubbing contact with the circumferential edges 34*a* of the magnets 34. As the shaft 33 is driven and the magnets 34 rotate, particles of material entrained with the liquid Q falling through the tee 10 are attracted to the magnets 34 and adhere thereto. As the magnets 34 rotate, the adhered particles L are brought into contact with the spring 44 and are displaced from the magnets 34 and dropped downwardly by gravity through the third legs 16 in tubular member O to accumulate above the second slide valve P. The downward movement of the displaced particles L through the tubular member O may be observed through the longitudinally extending window 30.

Figure 5:
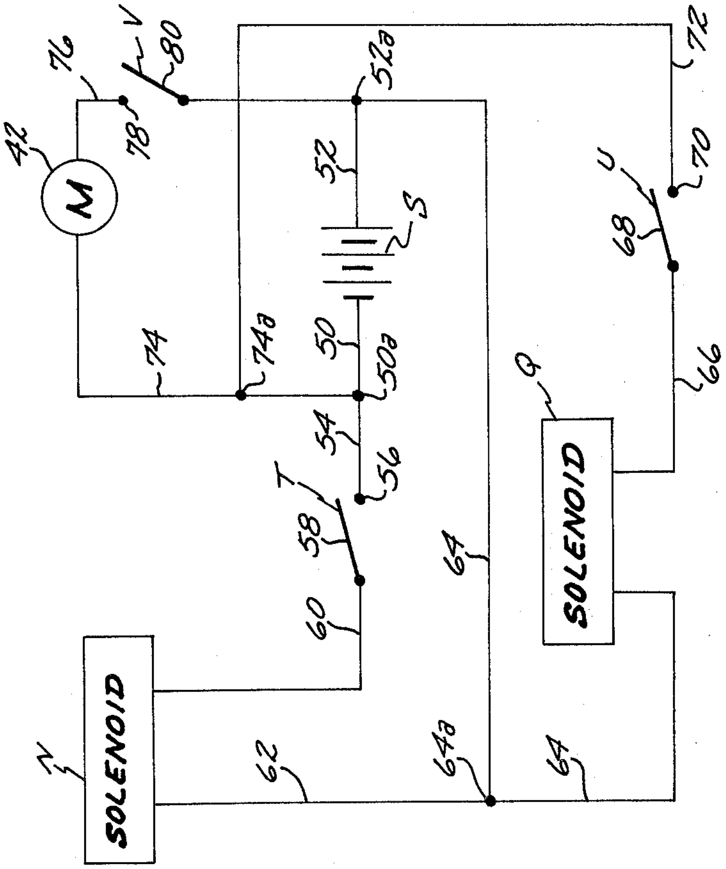
FIG. 5 is a diagrammatic view of an electric circuit that may be used to energize a first and second solenoid and the motor.

The invention A may be actuated by the electric circuit shown in FIG. 5. A source of electric power S has conductors 50 and 52 extending therefrom to junction points 50*a* and 52*a*. Junction point 50*a* has a conductor 54 extending therefrom to a contact 56 of a first switch T that has a movable armature 58.. Armature 58 is connected by a conductor 60 to a first terminal of first solenoid N. The second terminal of first solenoid N is connected by a conductor 62 to a junction point 64*a* in a conductor 64.

Conductor 64 has one end thereof connected to junction point 52*a* and the other end to a first terminal of second solenoid Q. The second terminal of second solenoid Q has a conductor 66 extending therefrom to an armature 68 of a second switch U that includes a contact 70. Contact 70 is connected by a conductor 72 to a junction point 74*a* in a conductor 74. One end of conductor 74 is connected to junction point 50*a* and the other end to a first terminal of motor 42. The second terminal of motor 42 is connected to a conductor 76 that extend to a contact 78 of a third switch V that includes an armature 80. Armature 80 has a conductor 82 extending therefrom to junction point 52*a*. By selectively closing the switches T, U and V the first and second solenoid N and Q and motor 42 may be electrically energized individually.

When it is desired to use the invention A the third switch V is placed in the closed position to energize motor 42 to rotate magnets 34.

The first valve M is spring biased to remain in the open position when the first solenoid N is not energized. The second valve P is spring-loaded to remain in the closed position when the second solenoid Q is not energized.

As fluid R flows through the tee 10, the particles of a magnetically attractable material R adhere to the rotatable magnets 34 and are displaced therefrom by contact with the strips 44 of the spring 42. The displaced particles L drop downwardly through the third leg 16, first valve M to accumulate above the second valve P. When it is desired to discharge the accumulated particles L that have accumulated above the second valve P, the switch tee is placed in the closed position to energize the solenoid N to place the valve M in the closed position. The second switch V is then closed to energize the solenoid Q to place the second valve P in the open position.

The accumulated particles L, together with the liquid standing in the tubular member O below the first valve M then being discharged through the spout 24 into the funnel 28 of the container 26. The second switch U is then moved to the open position to de-energize the solenoid Q to place the second valve in the closed position. The first switch T is then moved to the open position to de-energize solenoid N to allow the first valve M to return to the open position. Particles of magnetically attractable material L then flow downwardly by force of gravity through the third leg 16, first valve M to accumulate above the second valve P, which is in the closed position. The container 26, as it fills with liquid and separated particles of magnetically attractable material, may be periodically moved to a suitable location where the particles and liquid will dump therefrom.

The use and operation of the invention, as well as the structure thereof, have been described previously in detail and further description is unnecessary.

I claim:

1. A device for removing particles of a magnetically attractable material from liquid flowing through a line, which device includes:

a. a tubular rigid tee that includes first and second axially aligned legs, with a third leg being normally disposed relative to said first and second legs;

b. first means for connecting said tee to said line in such a manner that said liquid flows first through said first leg and then through said second leg, with said third leg being substantially vertically disposed;

c. a vertically disposed tubular member that has first and second ends, with said tubular member including a transparent window;

d. a first slide valve connected to said third leg and said first end of said tubular member, with said first slide valve normally being in an open position to permit said tubular member to fill with said liquid;

e. a second slide valve connected to said second end of said tubular member, said first slide valve normally being in a closed position to maintain said liquid in said tubular member;

f. a transverse shaft rotatably and sealingly supported in said tee intermediate said first and second legs and above said third leg, said shaft including a first end portion that projects outwardly from said tee;

g. power means for rotating said shaft in such a direction that the portion of said shaft most adjacent said third leg rotates towards said first leg;

h. a plurality of laterally spaced, circular, permanent magnets rigidly secured to said shaft, each of which magnets include a circumferential edge and a pair of side walls; and i. an elongate non-magnetic resilient spring that has first and second end portions, said second end portion being in the form of a plurality of laterally spaced, parallel, rectangular strips, with each of said strips being defined by a first free end edge and a pair of side edges, and said second end portion including a plurality of second end edges that extend between said strips; and j. means for so holding said spring from said first leg in said tee that said first end edges slidably engage said shaft, said side edges slidably engage said said walls, said second end edges slidably engage said circumferential edges, with said liquid as it flows through said tee having said particles of magnetically attractable material adhered to said magnets to be subsequently displaced therefrom upon contact with said spring to drop downwardly by force of gravity in said tubular member to accumulate therein above said second slide valve, and with said particles of magnetically attractable material that accumulates therein being discharged therefrom as said liquid continues to flow through said tee by placing said first slide valve in a closed position and second slide valve being in an open position to permit said particles of magnetically attractable material to discharge from said tubular member by force of gravity, together with the quantity of said liquid in said tubular member, said second and first slide valves being successively placed in closed and open positions after said discharge to again permit said tubular member to fill with said liquid and said particles of magnetically attractable material accumulate therein, and said particles of magnetically attractable material as they move downwardly in said tubular member being visible through said window.

2. A device as defined in claim 1 wherein said power means includes:

k. a driven pulley rigidly secured to said shaft exteriorly of said tee;

1. an endless belt that engages said driven pulley;

m. a driving pulley that engages said endless belg; and o. an electric motor that rotates said driving pulley.

3. A device as defined in claim 1 wherein said first and second slide valves are spring-loaded to remain in closed positions, and said first and second valves include:

k. first and second solenoids that move said first and second valves to open positions when said first and second solenoids are electrically energized;

1. an electric circuit connected to said first and second solenoids and to a source of electric power; and m. switch means in said circuit for selectively completing said circuit to said first and second solenoids.

* * * * *